3,462,465
6,7-METHYLENE STEROIDS
Kenneth G. Holden, Stratford, N.J., and James F. Kerwon,
Broomall, Pa., assignors to Smith Kline & French
Laboratories, Philadelphia, Pa., a corporation of
of Pennsylvania
No Drawing. Continuation-in-part of application Ser. No.
482,277, Aug. 24, 1965. This application May 22, 1967,
Ser. No. 640,404
Int. Cl. C07c *169/22, 169/10;* A61k *17/06*
U.S. Cl. 260—397.4   7 Claims

ABSTRACT OF THE DISCLOSURE

The α- and β-forms of 6,7-methyleneandrost-4-en-3-ones and 19-nor compounds are prepared by treating $\Delta^{4,6}$ compounds with dimethyl sulfoxonium methylide. The products have anabolic and androgenic activity.

---

This application is a continuation-in-part of copending Ser. No. 482,277, filed Aug. 24, 1965 now abandoned.

This invention relates to 6,7-methylene steriods having a high degree of hormonal activity. In particular, the invention relates to 6,7-methylene androst-4-en-3-ones (6,7-methylenetestosterones) and 6,7-methyleneestr-4-en-3-ones.

The compounds of the invention may be represented by means of the following structural formula:

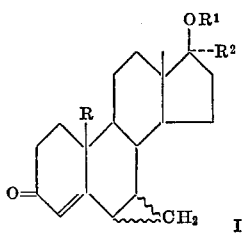

wherein:

R is hydrogen or methyl;
$R^1$ is hydrogen, lower acyl, cyclopentenyl, cyclohexenyl, or tetrahydropyranyl; and
$R^2$ is hydrogen, methyl, ethyl or ethynyl; with the proviso that when $R^1$ is cyclopentenyl, cyclohexenyl, or tetrahydropyranyl, $R^2$ is hydrogen.

A preferred group of compounds of the invention is represented by Formula I when R is methyl; $R^1$ is hydrogen or lower acyl; and $R^2$ is hydrogen, methyl, or ethyl.

Another important group of compounds is represented by Formula I when R is hydrogen, and $R^1$ and $R^2$ are as defined for Formula I.

The preferred compound of the inveniton is 6β, 7β-methylenetestosterone.

For purposes of the present invention, the term "lower acyl" is intended to represent those acyl groups having up to about five carbon atoms, particularly acetyl, propionyl, butyryl, and valeryl.

The processes disclosed hereinbelow for the preparation of the 6,7-methylene steroids are suitable for the purpose of preparing 6α,7α-methylene steriods and 6β,7β-methylene steriods. Both groups of isomers are thus within the scope of the present invention, and the wavy lines indicating the bonds between the methylene group and the 6- and 7-positions of the steriod nucleus are intended to represent both α and β compounds.

The compounds of the invention are prepared by treating a $\Delta^{4,6}$-17-hydroxy-3-keto steroid with dimethyl sulfoxonium methylide, which adds a methylene group across the 6,7-double bond. This reagent is formed in situ by reaction of dimethyl sulfoxide methiodide with a strong base such as sodium hydride. It is preferable to protect the 17-hydroxy group during the reaction by prior formation of a derivative such as the acetate. In the reaction, both 6α,7α-methylene and 6β,7β-methylene compounds are formed. The isomers are separated by fractional crystallization from solvents such as ether-hexane, and each 17-acetate is then saponified to the 17-alcohol by conventional methods.

The $\Delta^{4,6}$ starting materials for the preparation of the compounds are either described in the literature or are readily available by known methods. 17β-acetoxy and 17β-hydroxyandrosta-4,6-dien-3-one are described in J. Org. Chem. 29, 601 (1964). 17β-acetoxyestra-4,6-dien-3-one is described in J. Am. Chem. Soc. 80, 2596 (1958). Other 17α-alkyl compounds are also to be found in the literature.

The compounds of the invention, having androgenic and anabolic activity, are useful in those instances in which it is desired to increase or stimulate the androgenic response, and/or when it is desired to build body weight and muscle tissue. The principal compound of the invention, 6β,7β-methylenetestosterone, has been found to exhibit a high degree of androgenic and anabolic activity when administered at a dose of 20 mg./kg. subcutaneously to rats. A suspension in about 2 cc. of sesame oil is a suitable vehicle for administration. Other methods of formulation obvious to those skilled in the art of pharmaceutical chemistry are also suitable. This compound has also been found to possess natriuretic activity and to lower blood cholesterol levels.

The following examples are intended to illustrate the preparation of the compounds of the invention, and are not to be construed as limiting the scope thereof. Various obvious modifications in the compounds and in the procedures for the preparation which occur to those skilled in the art of organic chemistry are included within the scope of the present invention.

EXAMPLE 1

6α,7α-methylenetestosterone and 6β,7β-methylenetestosterone

A solution of 17.7 g. of 17β-acetoxyandrosta-4,6-dien-3-one in 150 ml. of dimethyl sulfoxide is slowly added to a solution prepared from 250 ml. dimethyl sulfoxide, 15.6 g. dimethyl sulfoxide methiodide and 2.80 g. of 55.6% sodium hydride. Reaction is allowed to proceed at 25° for 7 days, the reaction mixture is diluted with water, and the precipitate isolated by methylene chloride extraction. The crude product from the methylene chloride extract is purified by chromatography on Woelm activity III alumina. Benzene elution gives 6β,7β-methylenetestosterone acetate, after crystallization from ether-hexane solution, M.P. 166–70°.

The filtrate from the recrystallization is dissolved in 80 ml. methanol and 3.0 g. of sodium carbonate in 20 ml. water is added. The agitated mixture is refluxed under nitrogen for 18 hours, diluted with water and the precipitate extracted into methylene chloride. Removal of solvent and crystallization of the residue from acetone gives 6α,7α-methylenetestosterone, M.P. 189–193°.

Saponification of 4.0 g. of 6β,7β-methylenetestosterone acetate with 100 ml. of methanolic sodium carbonate solution for 18 hours at reflux temperature gives 6β,7β-methylenetestosterone, M.P. 232–6° after recrystallization from acetone.

EXAMPLE 2

6α,7α-methylene-17β-hydroxyestr-4-en-3-one and 6β,7β-methylene-17β-hydroxyestr-4-en-3-one A solution of 17.0 g. of 17β-acetoxyestra-4,6-dien-3-one in 150 ml. of dimethyl sulfoxide is added to a mixture of 15.6 g. of dimethyl sulfoxide methiodide and 2.80 g. of 55.6% sodium hydride in 250 ml. of dimethyl sulfoxide as in Example 1. The reaction is carried out and worked up as described, and the isolated crude mixture of α and β acetates is chromatographed. Fractional crystallization of the eluted material separates the α and β forms, and each form is then saponified to give the title products.

EXAMPLE 3

6α,7α-methylene-17α-methyltestosterone and 6β,7β-methylene-17α-methyltestosterone A solution of 18.5 g. of 17β-acetoxy-17α-methylandrosta-4,6-dien-3-one (Brit. Pat. 846,920) in 150 ml. of dimethyl sulfoxide is added to a mixture of 15.6 g. of dimethyl sulfoxide methiodide and 2.80 g. of 55.6% sodium hydride in 250 ml. of dimethyl sulfoxide as in Example 1. The reaction is carried out and worked up as described, and the isolated crude mixture of α and β acetates is chromatographed. Fractional crystallization of the eluted material separates the α and β forms, and each form is then saponified to give the title products. Use of the 17α-ethyl starting material (U.S. 2,874,170) in the above procedure results in the formation of the corresponding 17α-ethyl products.

EXAMPLE 4

6α,7α-methylene-17β-hydroxy-17α-ethylylestr-4-en-3-one and 6β,7β-methylene-17β-hydroxy-17α-ethynylestr-4-en-3-one A solution of 18.3 g. of 17β-acetoxy-17α-ethynylestra-4,6-dien-3-one (U.S. 2,946,809) in 150 ml. of dimethyl sulfoxide is added to a mixture of 15.6 g. of dimethyl sulfoxide methiodide and 2.80 g. of 55.6% sodium hydride in 250 ml. of dimethyl sulfoxide as in Example 1. Purification, separation of the α and β forms, and saponification of the separated esters gives the title products.

EXAMPLE 5

6β,7β-methylenetestosterone 1-cyclopentenyl ether

A mixture of 10 ml. of distilled cyclopentanone dimethyl ketal and 4.8 g. of 6β,7β-methylenetestosterone is placed in a flask equipped with a water trap. The mixture is heated at 150–75° (bath temperature) until the collection of distillate is complete. The residue is cooled and then diluted with alcohol, water, or a mixture thereof to give the title product. Use of cyclohexanone dimethyl ketal gives the 1-cyclohexenyl ether.

EXAMPLE 6

6β,7β-methylene-17β-propionoxyestr-4-en-3-one

A solution of 1 g. of 6β,7β-methylene-17β-hydroxyestr-4-en-3-one in 10 ml. of pyridine is allowed to stand overnight with 10 ml. of propionic anhydride. Addition of water results in the precipitation of the propionate derivative, which is then purified by recrystallization.

EXAMPLE 7

6β,7β-methylenetestosterone 2-tetrahydropyranyl ether

A mixture of 10 ml. of dihydropyran, 4.5 g. of 17β-hydroxyandrosta-4,6-dien-3-one, and a catalytic amount of p-toluenesulfonic acid is kept at room temperature for several hours.

The residue is diluted with water, the solution neutralized with sodium hydroxide, and the solution extracted with methylene chloride. Drying and evaporation of the extracts gives the tetrahydropyranyl ether of the 4,6-diene. Treatment of this compound with dimethyl sulfoxide methylide, followed by separation of the α and β-isomers according to the procedures of Example 1, gives the title product.

We claim:

1. A compound of the formula

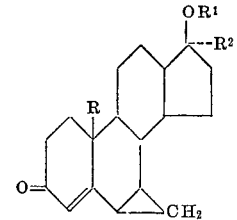

wherein:

R is hydrogen or methyl;

R¹ is hydrogen, lower acyl, 1-cyclopentenyl, 1-cyclohexenyl, or 2-tetrahydropyranyl; and R² is hydrogen, methyl, ethyl, or ethynyl; with the proviso that when R¹ is 1-cyclopentenyl, 1-cyclohexenyl, or 2-tetrahydropyranyl, R² is hydrogen.

2. A compound as claimed in claim 1 in which the 6,7-methylene group is bonded β to the steroid nucleus.

3. A compound as claimed in claim 2 in which R is methyl.

4. A compound as claimed in claim 2 in which R is hydrogen.

5. A compound as claimed in claim 1 in which R is methyl; R¹ is hydrogen or lower acyl; and R² is hydrogen, methyl or ethyl.

6. 6β,7β-M[m]ethylenetestosterone or its acetate.

7. 6β,7β-M[m]ethylenetestosterone.

References Cited

UNITED STATES PATENTS

| | | |
|---|---|---|
| 3,047,566 | 7/1962 | Godtfredsen et al. __ 260—239.55 |
| 3,200,113 | 8/1965 | Christiansen et al. __ 260—239.5 |
| 3,243,434 | 3/1966 | Krakower _____ 260—239.55 |

HENRY A. FRENCH, Primary Examiner

U.S. Cl. X.R.

260—239.55; 424—243